May 8, 1962   B. I. VOICE   3,032,936
CONTACT LENS POLISHING ASSEMBLY
Filed Aug. 8, 1958

INVENTOR.
BERNARD I. VOICE
BY Amster & Levy
ATTORNEYS

United States Patent Office

3,032,936
Patented May 8, 1962

1

3,032,936
CONTACT LENS POLISHING ASSEMBLY
Bernard I. Voice, Brooklyn, N.Y., assignor to Stolper & Voice Optical Company, Inc., New York, N.Y., a corporation of New York
Filed Aug. 8, 1958, Ser. No. 753,901
2 Claims. (Cl. 51—124)

This invention relates to improvements in the manufacture of plastic contact lenses, and more particularly to a method of forming and mounting lenses for the polishing and finishing thereof and a new and improved holder for such lenses.

Opthalmic contact lenses are presently made of acrylic resins, such as methyl methacrylate, of a hollow, semispherical shape and sized to cover the corneal region of the eye. The manufacture of such lenses including the polishing and finishing thereof is performed in its entirety at a lens manufacturing plant, the optician sending to such plant the optical prescription for the lens, and the lens being ground, polished and finished and sent in its final form to the optician.

Contact lenses are initially formed by grinding a plastic blank to generate optical curves of selected radii on the inside and outside of the lens. After grinding, both the concave and convex lens surfaces must be polished to form the completed lens. Such polishing is a difficult and costly operation since hitherto it has been difficult to mount the thin ground lens during the polishing operation, and such operation has required the use of complex and expensive polishing machines and apparatus. Further, the lens polishing has often varied the desired lens curvature to affect the optic properties of the lens, requiring the lens to be returned to the manufacturing plant for further processing.

It would therefore be desirable to provide means wherein the optician himself may perform the polishing operation, the ground contact lens blank being delivered to the optician according to prescription and the polishing and finishing operations being done by the optician as required. Such a procedure would greatly decrease the cost of the finished lens and would provide a means whereby the optician could obtain the exact polish and finish desired without having to return the lens to the manufacturer.

According to the invention, there is provided a simple, inexpensive, and extremely effective mount for a plastic contact lens, by means of which the ground lens may be mounted on a spindle for the polishing thereof. To enable the mount to be used, there has been devised a novel manner of forming the ground lenses to provide a relatively thick and strong peripheral flange or ring around the lens which can receive and be retained by the mount. The apparatus for polishing the lenses, including the lens mount, can be made in such a simple and inexpensive form that it can be made available to opticians who can then use it for polishing the ground, but unfinished lens blanks supplied by the lens manufacturing company.

It is the principal object of this invention therefore to provide a novel form of ground contact lens blank which is adapted to be easily and effectively held by a lens mount of novel construction for the polishing and finishing of such lens blank.

Another object of the invention is the provision of a lens blank form and a lens mount having cooperating mounting means adapted to hold the lens blank in position for polishing both sides thereof, that is to say, for polishing its convex surface and its concave surface. The cooperating mounting means are so formed as to insure that the centers of both the convex and concave surfaces will be in exact alignment during the polishing of both sides of the lens.

2

Additional objects and advantages of the invention will become apparent during the course of the following specification when taken in connection with the accompanying drawings, in which.

Figure 4:
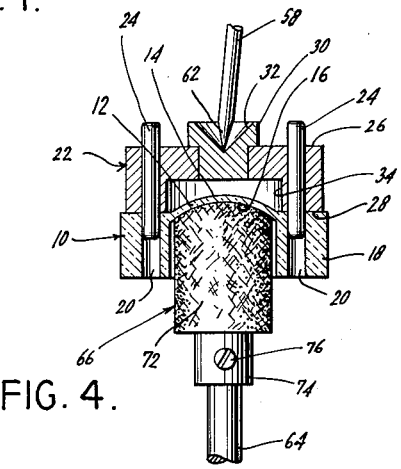
FIG. 4 is a sectional view of the lens blank mount corresponding to FIG. 3, and showing a lens blank attached to the mount, and a polishing tool in the process of polishing the concave surface of the lens blank.
Figure 5:
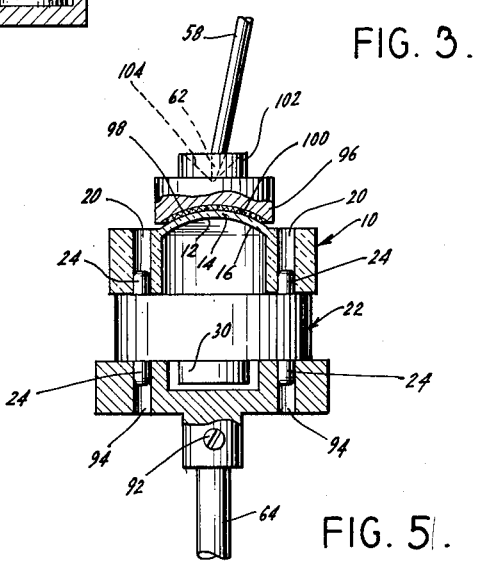
FIG. 5 is an elevational view of the lens blank mount shown in FIGS. 2 and 3, and showing a lens blank attached to the mount, a polishing tool in the process of polishing the convex surface of the lens blank, and a spindle mount carrying the lens blank mount, portions of the assembly being shown in section.

Referring in detail to the drawings, FIGS. 4 and 5 show a lens blank 10 formed in accordance with the invention. The lens blank 10 is preferably cut from a cylindrical rod of transparent plastic material such as a methyl methacrylate or other acrylic resin. The lens blank 10 is thus initially formed in the shape of a flat cylindrical block and is appreciably larger in diameter than the diameter of the lens to be formed.

The lens blank 10 shown in FIGS. 4 and 5 has been partially manufactured, that is to say a lens portion 12 has been ground in the center thereof in the conventional manner, curves being generated on opposite sides thereof to produce the optical qualities required. Thus, the lens portion 12 has an outer convex surface 14 and an inner concave surface 16, the two surfaces having differing radii of curvature to provide the optical properties of the lens.

In the preliminary manufacture of the lens, only the central lens portion 12 is ground, so that there is left on the lens blank an annular outer marginal portion or flange 18. This flange 18 is to be used for mounting the lens blank 10 during the polishing operation, so that for the sake of structural strength and rigidity, the flange 18 is made wide and thick relative to the central lens portion 12. In one commercial embodiment, for example, the central lens portion was 11 mm. in diameter while the over-all diameter of the blank 10 including the marginal portion 18 was 26 mm. Thus the marginal portion extended 7.5 mm. beyond the central portion to the edge of the lens blank. The marginal portion 16 was 6 mm. in height.

The marginal flange 18 is provided with a plurality of through bores 20 which serve as means for mounting the lens blank 10 on the lens mount 22. Any suitable number of said bores 18 may be provided for secure mounting, although for convenience a pair of diametrically-opposed bores 20 are shown in FIG. 4 to receive a corresponding pair of pins 24 in the lens mount 22. If a larger number of mounting bores 20 are provided in the lens blank 10, say three or four, a corresponding number of pins 24 would be provided in the lens mount 22.

The bores 20 are made of slightly smaller diameter than the pins 24 so that when the lens blank 10 is mounted on the lens mount 22, the pins are press-fit within the bores and the lens blank is securely held by the lens mount until it is pried off for removal.

The lens mount 22 is preferably made of a strong metal such as steel, and is of flat cylindrical shape, having planar top and bottom surfaces 26 and 28. The lens mount 22 is preferably of the same or slightly lesser diameter than the lens blank 10. The pins 24 are set within the body of the lens mount 22 so that they project at their top and bottom ends beyond both top and bottom surfaces 26 and 28. At its top end, the lens mount 22 has a central upstanding boss 30 located between the pins 24, the boss projecting above the top surface 26 and having a central conical recess or cavity 32. A larger circular depression or well 34 is formed centrally in the bottom surface 28 of the lens mount 22, the well 34 being of somewhat larger diameter than the diameter of the central lens portion 12 of the lens blank 10 so as to receive the convex lens surface 14 during the polishing operation as shown in FIG. 4, and as will be presently described in greater detail.

Figures 1, 2, 3:
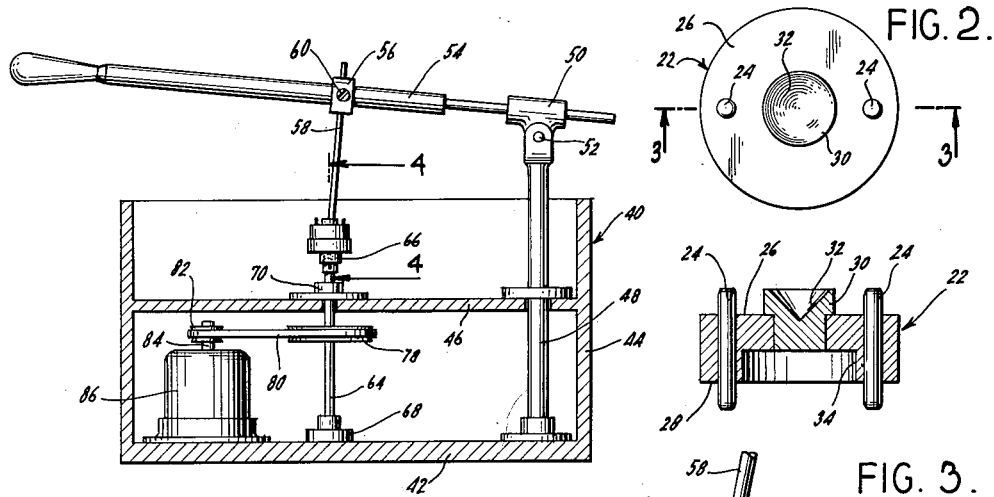
FIG. 1 is a side elevational view of a polishing machine incorporating the present invention, with the housing thereof shown in section to reveal inner constructional detail.
FIG. 2 is an enlarged plan view of a lens blank mount made in accordance with the invention.
FIG. 3 is a section taken along line 3—3 of FIG. 2.

FIG. 1 shows a polishing machine which is made to receive the lens blank 10 and lens mount 22. The machine includes a housing 40 having a base 42, upstanding walls 44 and a transverse partition wall 46 spaced above the base 42. Mounted on the base 42 and extending through the partition wall 46 is an upright standard 48 upon which a collar 50 is mounted by pivot 52. The end of a lever arm 54 extends through and is carried by said collar 50, the lever arm 54 being axially slidable and rotatable within the collar 50 for adjustment thereof and being held in adjusted position by set screws (not shown). Mounted on the lever arm 54 for adjustable sliding movement therealong is a bracket 56. The bracket 56 carries a stylus 58 which may be slid longitudinally therethrough and is held in adjusted position by a set screw 60. The stylus 58 has a pointed end 62 whch is sized to fit within the bushing 30 of the lens mount 22 for holding the latter during the polishing operation, as will be presently described.

An upstanding spindle 64 is rotatably mounted in the housing 40 and extends through the partition wall 46, the upper end of the spindle 64 projecting above said partition wall and carrying a polishing head 66. For purposes of free rotation, the bottom end of the spindle 64 is journalled in a bearing 68 fixed to the housing base 42, while an intermediate portion of the spindle is journalled in a bearing 70 affixed to the partition wall 46.

The polishing head 66 may be in the form of a brass tool having a covering 72 of a soft material such as cloth, felt or the like. The polishing head is selected to have the same radius of curvature as the lens surface to be polished, and for this purpose is adapted to be removably secured to the spindle 64. The head 66 therefore has a depending hollow extension 74 sized to receive the end of spindle 64, and a set screw 76 is provided to hold the extension 74 rigidly and immovably on the spindle 64.

Affixed to an intermediate portion of spindle 64 is a pulley 78 connected by a belt 80 to a pulley 82 mounted on the drive shaft 84 of an electric motor 86. The motor 86 is mounted on the base 42 of housing 40 and is adapted to rotate the spindle 64 and polishing head 66 rapidly through the belt 80.

In practicing the improved method of polishing lenses, the lens blank 22 is preliminarily formed by grinding the concave and convex lens surfaces in the usual manner with a diamond or steel tool to generate curves on both sides of the plastic blank. The lens blank is cut in such a manner as to provide the integral flange portion 18 surrounding the lens portion, and the bores 20 are drilled in the flange portion.

In polishing the ground lens blank, the lens blank 10 is mounted on the lens mount 22. For purposes of illustration it will be assumed that the concave lens surface will be first polished. The lens blank 10 is then inserted on the lens mount 22 in such a manner that the pins 24 of the lens mount enter the bores 20 of the lens blank, and the parts are pressed together until the upper surface of the lens blank 10 rests flush upon the lower surface 28 of the lens mount 22, as shown in FIG. 4. In this position, the convex lens surface 14 is received within the well 34 of the lens mount so that the lens blank 10 is securely held by the lens mount 22 and is in true alignment therewith.

A polishing head 66 is now selected with a top end having a radius of curvature conforming with the radius of curvature of the concave lens surface 16. The polishing head 66 is covered by the layer of soft material 72, which may be applied by a suitable cement, and is then attached to the spindle 64. Abrasive polishing material such as tin oxide is then brushed on the surface of the covering layer and the lens blank 10 with attached lens mount 22 is placed on the polishing head 66 as shown in FIG. 4. The pointed end 62 of the stylus 58 is then inserted in the conical cavity 32 of the lens mount boss 30 and downward pressure is applied to the lever arm 54 to hold the lens blank 10 in position atop the polishing head 66.

The motor 86 is then energized, spinning the polishing head 66 and polishing the concave lens surface 16 of the lens blank 10. During this polishing operation, downward pressure is maintained on the lever arm 54, the stylus 58 holding the lens mount 22 and attached lens blank 10 in proper position. The angle of the lens mount and lens blank relative to the polishing head may be varied manually when desired, the pointed end 62 of the stylus 58 cooperating with the conical cavity 32 to hold the lens mount immovably even in such tilted positions.

In polishing the convex surface 14 of the lens blank 10, the latter is removed, inverted and replaced on the lens mount 22, the pins 24 again fitting within the bores 20, except that they extend into the opposite ends of said bores. For this part of the polishing operation, a different type of polishing head may be attached to the spindle 64, this type of polishing head having a concave upper end instead of the convex end of the polishing head shown in FIG. 2. In such an instance, a polishing head would be selected with a concave end having a radius of curvature conforming to the radius of curvature of the lens convex surface 14. The polishing operation is performed in the same manner as for the concave lens surface, as previously described.

While the above method may be used to polish the convex lens surface 14, the preferred method is to mount the lens on the spindle and rotate the lens relative to a stationary lapping tool. This preferred method is illustrated in FIG. 5, and the lens mount 22 is again utilized to hold the lens blank 10.

After the concave lens surface 16 has been polished, as shown in FIG. 4 and as previously described, the lens blank 10 is inverted and replaced on the lens mount 22 with the convex lens surface 14 facing outwardly. A mounting head 90 is then attached to the spindle 64 by means of a set screw 92. The mounting head 90 is provided with a plurality of bores 94 corresponding in number and position to the pins 24 of the lens mount 22, the bores 94 being of slightly smaller diameter than the pins 24 so that said pins must be press-fit within said bores when the lens mount 22 is attached to the mounting head 90, as shown in FIG. 5. It will be observed that the projecting ends of pins 24, opposite the lens blank 10, are inserted in the mounting head bores 94 so that the mounting head 90 securely holds the lens mount 22 while the latter securely holds the lens blank 10 with its convex lens surface 14 exposed and facing upwardly. When the motor 86 is energized, the lens blank 10 will thus be rotated by spindle 64.

For polishing the convex lens surface, a lapping tool 96 is utilized, the lapping tool being made of a strong metal and having a concave lower surface 98 whose radius of curvature matches the radius of curvature of the convex lens surface 14 to be polished. This concave lower surface 98 has a covering 100 of cloth or other soft material to which is applied an abrasive polishing material such as tin oxide. At the top of the lapping tool 96 is a boss 102 containing a conical cavity 104 which are similar to the boss 30 and conical cavity 32 of the lens mount 22.

The lapping tool 96 is placed upon the exposed convex lens surface 14 of the mounted lens blank 10, as shown in FIG. 5, and the pointed end 62 of stylus 58 inserted into the conical cavity 104. The polishing operation is performed as previously described, except that in this instance, the lens blank 10, and not the polishing member, is rotated. The stylus 58 and conical cavity 104 permit selective variation of the angle of the lapping tool 96 upon the lens surface 14.

After both lens surfaces of the lens blank have been properly polished, the marginal flange 18 is cut off, leaving the central lens portion 12 as the completed contact lens. It will be appreciated that in polishing one lens surface and then the other lens surface, the same lens mount pins 24 are inserted within the same lens blank bores 20. Thus, the center of the lens blank is always held in exactly the same position relative to the lens mount no matter which lens surface is exposed for polishing. This insures that the polishing operation for both lens surfaces will be uniform, the downward pressure of the stylus 58 on the lens mount 22 registering with the exact center of the lens blank 10, and the center of rotation of the lens blank, mounted as in FIG. 5, being at the exact center of the lens blank.

Figure 6:
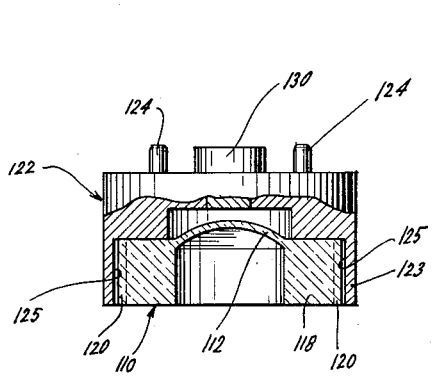
FIG. 6 is an elevational view, partially in section of a modified form of lens blank mount and a corresponding modified lens blank made to fit said mount.
Figure 7:
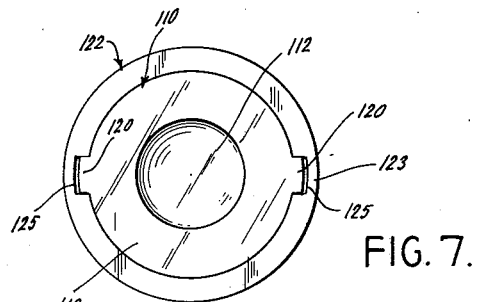
FIG. 7 is a top plan view of the lens blank and mount shown in FIG. 6.

While the use of the pins 24 and lens blank bores 20 is preferred as the most practical means of mounting the lens blank, it will be understood that the invention herein contemplates the use of any interfitting means which will hold the lens blank 10 securely on the lens mount and prevent the lens blank from rotating relative to the lens mount. FIGS. 6 and 7 show an alternate embodiment in which a lens blank 110 similar to the lens blank 10 is provided with a central lens portion 112 surrounded by a peripheral flange 118. Instead of providing mounting bores in the flange, however, said flange 118 is formed with a plurality of integral lugs 120 projecting radially from the circumferential surface of the lens blank.

The lens mount 122 shown in FIG. 6 is made as formerly described, except that it is provided with a marginal depending skirt 123 sized to receive the flange 118 of the lens blank 110 and having a plurality of slots 125 sized to receive the lugs 120 of the lens blank. The lugs 120 are sized to be press-fit within the slots 125 so that once inserted, the lens blank 110 is tightly gripped by the lens mount 122. It will be obvious that the arrangement of lugs and slots may be reversed, the lens mount carrying the lugs and the lens blank containing the slots, and that the number of corresponding slots and lugs may be selected as desired.

The lens mount 122 may be provided with pins 124 projecting from its upper surface for attaching the lens mount to a spindle mounting head, as was previously described in connection with FIG. 5. The lens mount 122 is also provided with a bushing 130 at its top surface, the bushing containing a conical cavity similar to the cavity 32 for receiving the pointed end of stylus 58.

In practicing the invention, it is contemplated that the lens blanks be made at a laboratory and supplied in the unpolished state to the optician who ordered a lens ground to prescription. The optician would be supplied with the polishing machine shown in FIG. 1 including a series of polishing heads or lapping tools with a variety of radii of curvature, so that the proper radius head or tool could be selected for the particular polishing operation. The mounting of all of the lens blanks, however, can be achieved by the use of a single lens mount. Thus, the optician himself can polish and finish the lens as required in a more efficient manner than could the lens-grinding laboratory, and considerable economy in the over-all cost of the lens could be effected.

While preferred embodiments of the invention have been shown and described herein, it is obvious that numerous omissions, changes and additions may be made in such embodiments without departing from the spirit and scope of the invention.

What is claimed is:
1. A contact lens polishing assembly comprising a lens mount for receiving and retaining a contact lens blank having a central lens portion and including convex and concave lens surfaces and a marginal flange surrounding the central lens portion and having a plurality of through mounting bores, said lens mount including a body portion having a flat upper surface and a flat lower surface, a boss centrally located on said upper surface and having a stylus-receiving conical cavity therein, said body portion having a cylindrical cavity in said lower surface to receive the convex lens surface when the lens blank is mounted on said flat lower surface, said body portion having a plurality of holes therethrough, a plurality of pins extending through said holes for projecting above said upper and lower surfaces, said pins being longer than said body portion and being sized of a greater diameter than said bores to clampingly fit in said bores to hold the lens blank, a rotating spindle, a polishing head removably mounted on said spindle, a lever pivotally mounted above said spindle and a stylus carried by said lever and depending therefrom and engaging said boss in said conical cavity to hold said lens blank against said polishing head.

2. A contact lens polishing assembly comprising a lens mount for receiving and retaining a contact lens blank having a central lens portion and including convex and concave lens surfaces and a marginal flange surrounding the central lens portion and having a plurality of through mounting bores, said lens mount including a body portion having a flat upper surface and flat lower surface, a boss centrally located on said upper surface and having a stylus-receiving conical cavity therein, said body portion having a cylindrical cavity in said lower surface to receive the convex lens surface when the lens blank is mounted on said flat lower surface, said body portion having a plurality of holes therethrough, and a plurality of pins extending through said holes for projecting above said upper and lower surfaces, said pins being longer than said body portion and being sized of a greater diameter then said bores to clampingly fit in said bores to hold the lens blank.

References Cited in the file of this patent

UNITED STATES PATENTS

| | | |
|---|---|---|
| 1,296,050 | Cossman | Mar. 4, 1919 |
| 1,979,175 | Robertson | Oct. 30, 1934 |
| 2,133,498 | Dittmer | Oct. 18, 1938 |
| 2,264,392 | McClernon | Dec. 2, 1941 |
| 2,437,436 | Mullen | Mar. 9, 1948 |

FOREIGN PATENTS

| | | |
|---|---|---|
| 630,402 | Great Britain | Oct. 12, 1949 |